INVENTOR.
ROBERT A. HODGSON

United States Patent Office 3,545,177
Patented Dec. 8, 1970

3,545,177
GAS DEHYDRATION PROCESS
Robert A. Hodgson, Tulsa, Okla., assignor to Maloney-Crawford Tank Corporation, Tulsa, Okla., a corporation of Delaware
Continuation-in-part of application Ser. No. 770,207, Oct. 24, 1968. This application Sept. 15, 1969, Ser. No. 864,257
Int. Cl. B01d 53/28
U.S. Cl. 55—30                 11 Claims

ABSTRACT OF THE DISCLOSURE

Brine is caused to pass, once through and without regeneration, countercurrent to a wet gas stream to dehydrate the latter.

RELATED APPLICATION

This application is a continuation-in-part of copending application Ser. No. 770,207 filed Oct. 24, 1968, and now abandoned.

BACKGROUND OF THE INVENTION

Removal of water from gas has been a problem which has been well explored in the art. Efforts are made to remove water not only to upgrade the resulting gas for commercial purposes but to prevent the formation of hydrates and plugged lines from freezing during cold weather. In addition, corrosion may be caused by the presence of water in the gas deteriorating pipeline and other equipment.

The use of calcium chloride brine for water absorption is old and until recently has been gradually replaced by glycol (diethylene glycol or triethylene glycol) processes. Such processes require the heated regeneration of the glycol, the heat requirement being satisfied by a direct fired reboiler.

Vapor-liquid contacting processes and apparatus for dehydrating gas and using brine therefor as the dehydrating agent have been taught heretofore in United States patents such as Nos. 2,916,103; 2,804,935; 2,804,940 and 2,804,941. However, these processes and apparatus have heretofore taught that the brine used in the countercurrent type flow dehydration process is derived from the contact of water, in the gas being treated, with a solid bed of deliquescent material such as calcium chloride pellets. The bed of calcium chloride is usually supported on a screen or perforated plate as the last treatment of the gas. The residual water vapor in the gas at this point is readily taken up in the calcium chloride, dissolving the calcium chloride into and combining with the water for forming liquid brine which then drops downwardly in a series of reflux trays.

The problems of dehydration of gas in remote locations, especially offshore wells, have been compounded recently by safety and pollution requirements placed on producers. That is, any process requiring heat or flame not only necessitates continued monitoring but creates danger of fire and explosion. Offshore locations in many instances require a separate expensive platform for the fired equipment. Fired glycol regenerator reboilers have the added disadvantage of being unable to operate in high winds such as are encountered offshore and in certain mountainous regions. They are inefficient at high altitudes due to lack of oxygen for the burning of fuel gas. Salt accumulations, in glycol reboilers, are a very common problem which decreases the heat transfer and causes firetube burn-out, creating hazardous conditions. Pipeline rust, sand and heavy, high melting hydrocarbons can also contaminate glycols causing burn-out and corrosion of fired equipment.

In those instances where solid desiccant materials are used, the solid, from time to time, needs to be replaced and involves large amounts of equipment, labor and shut-down time since it is a batch process.

Current regulations of the Department of Interior and the various state regulatory bodies preclude pollution of the sea waters and disposal of liquid waste materials is limited to salt water.

SUMMARY

Accordingly, it is an object of invention to provide a gas dehydration process and apparatus utilizing brine which can be a waste product and using such brine prior to its disposal in a substantially continuous process. The invention further eliminates the need for heat or a fired heater or expensive isolated platform when used offshore. A further object of the invention is to provide a gas dehydration process that can be installed at the bottom of the sea in conjunction with other submerged oil or gas well completion techniques and therefore will not be subject to atmospheric or climatic conditions.

This invention further provides process and apparatus which utilizes a nonregenerated brine solution which is the waste byproduct of other chemical processes, or a brine solution previously made from solid calcium chloride or other salts and water. The dew point of the outlet gas is adjusted either by varying the brine concentration or rate or, preferably, by refrigerating or otherwise cooling the brine prior to injecting it into the gas contacting tower. Because the density of brine is heavier than hydrocarbons which might be condensed from the gas being treated, there is less likelihood of hydrocarbon discharge in the removed waste brine. Pumps can be gas-operated. Further, the process and apparatus of this invention lend to a stable operation since there is no recharging of once used brine and dew points are not affected by solid desiccant bed changes or bridging or channeling of gas therethrough. More importantly is reliable remote and unattended operation unaffected by winds, rain, altitude or submergence.

BRIEF DESCRIPTION OF THE DRAWINGS

FIG. 4 is a partial sectional view of a modified form of tray design to be used in this invention.

DESCRIPTION OF THE PREFERRED EMBODIMENT

Figure 1:
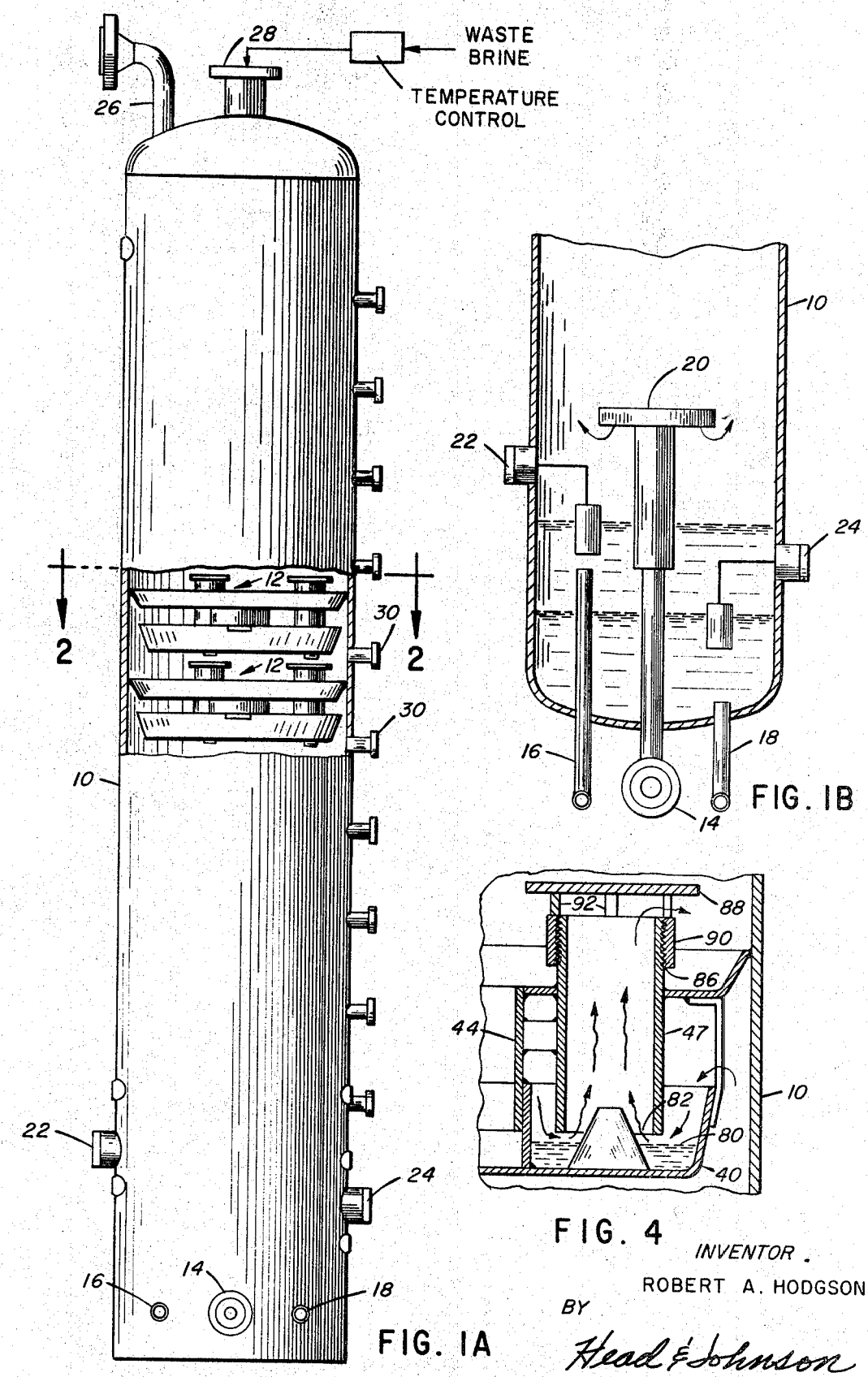
FIG. 1A is a side elevational view, partly cut away, of a typical unit constructed in accordance with this invention.
FIG. 1B is a partial sectional view of the lower portion of the unit of this invention.
Figure 2:
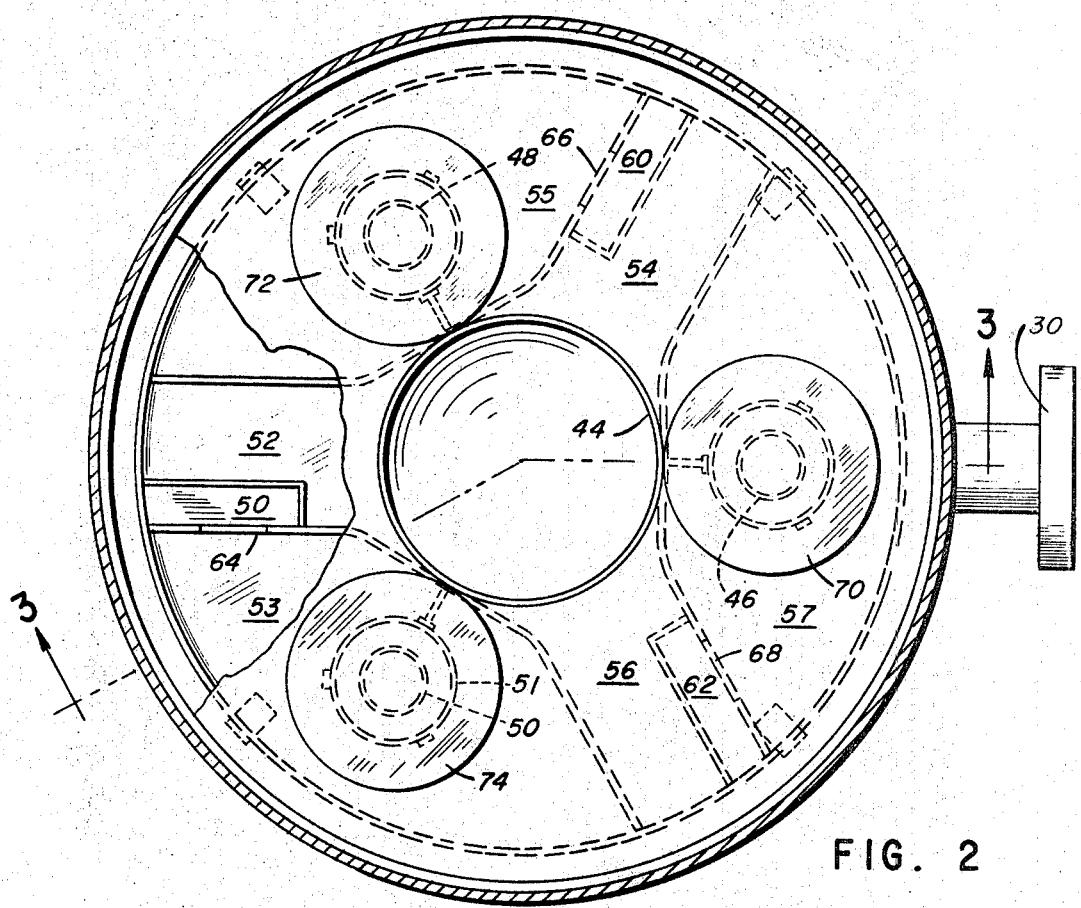
FIG. 2 is a sectional view taken along the line 2—2 of FIG. 1A.
Figure 3:
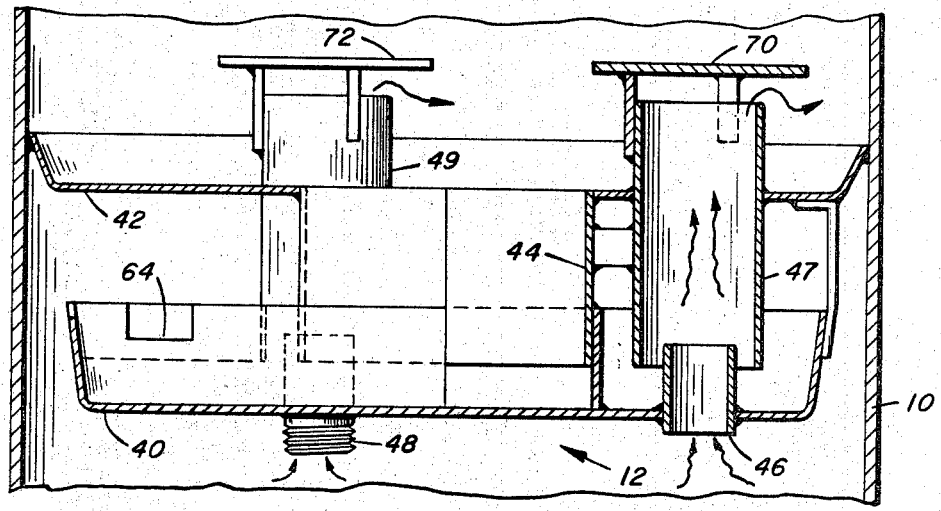
FIG. 3 is a sectional view taken along the line 3—3 of FIG. 2.

Referring now to the drawings, in FIGS. 1A and 1B tower 10 is shown as typically involving a vertically disposed cylindrical housing or casing, within which are a plurality of horizontally disposed trays generally designated by the numeral 12. In the lower portion of the tower are found typical control means including a wet gas inlet 14, an oil or distillate outlet 16, and a brine or water outlet 18. The inlet includes a horizontally disposed baffle 20 as a primary water knockout means prior to the gas serially passing through the trays 12 which will be found immediately upward thereof. Suitable float control devices 22 and 24 respectively control the level of distillate or oil and brine. The dry gas outlet 26 is positioned in the upper portion of the tower adjacent a brine inlet connection 28. A plurality of tray inspection hand hold openings 30 are provided at each tray position in the event it is necessary to modify flow characteristics of each tray as may be necessary and to insure proper operation of each tray relative to the contact of wet gas with countercurrent flowing brine. Each tray unit 12 basically comprises a lower weir skimming tray 40 and an upper brine receiving tray 42 spaced and interconnected by central downcomer 44. Tray 42 has an outward diameter and is connected, as by welding, to the tower interior wall 10 to collect all of the brine overflowing as from the next upward adjacent tray section while the lower tray 40 is of diameter substantially less than the interior diameter of tower 10 to permit overflow therefrom. Equally spaced around the tray are a plurality of gas injection nozzles, three in this instance, 46, 48 and 50. One or more of the nozzles may include threads as shown at nozzle inlet 48 in the event it is desirable to change the gas flow or velocity characteristics across a particular tray. This is accomplished by a cap being threaded thereon through the opening 30 immediately therebelow hence causing the gas to pass through the remaining nozzle or nozzles. The downcomer 44 centrally located is interconnected to a common brine receiving channel in the lower tray 40 which comprises areas 52, 54 and 56 into which the brine flows, any excess therein skimming off of the top of the bottom tray 40. Each of the areas includes respective brine level control portions 53, 55 and 57 which is maintained at a constant level by brine passing from the common sections 52, 54 and 56 into adjacent receiving areas 50, 60 and 62. Weirs 64, 66 and 68, in each area, best shown in FIG. 3, are adapted to maintain a constant level of brine within the adjacent area 53, 55 and 57, respectively and to skim off any hydrocarbons collecting on the surface of the brine. This maintains the same constant level surrounding each nozzle 46, 48 and 50 and concentric conduits 47, 49 and 51 wherein the gas passing at a high velocity through the nozzle draws and entrains the collected brine from areas 53, 55 and 57 which passes upwardly and is deflected by respective baffles 70, 72 and 74 to assist in causing separation with the heavier brine particles collecting into tray 42 for recirculation.

In the embodiment of FIG. 4, aspiration of the gas occurs by passage over the top of bottom tray across the top of brine level 80 into a constricted passage 82 caused by the relative location of conical member 84 concentrically positioned at the lower end of each concentric conduit 47. Adjustment of flow in the conduit and across the tray may be accomplished by providing threads 86 at the upper end thereof. Deflector baffle 88 connects to a cylindrical sleeve 90 by risers 92 and hence may be adjustable, through a hand hole in the side of vessel 10, not shown, to achieve a desired flow relationship. In some instances a threaded cap may be used to inhibit all flow across one or more passageways.

OPERATION

In a typical operation, the apparatus of this invention is preferably situated at or adjacent the well head of a gas producing well, on an offshore platform, or on the ocean floor, or on a mountain top, or any other remote place where the well exists. There is available from a plant, tank storage, warehouse or any other source near or adjacent the well, a supply of calcium chloride brine. Waste brine which ordinarily would have been dumped in an underground disposal or in the ocean at appropriate and designated places can be used in the operation. Preferably, when using calcium chloride brine it should measure a specific gravity of 1.35 to 1.40. The gas flow in a typical test was 6.02 MM s.c.f.d. at a pressure of 1200 p.s.i.g. The gas at an inlet temperature of 93° contained 45 pounds of water per million cubic feet of gas. The inlet brine was circulated at a rate of 4 gallons per MM s.c.f. gas or 16.04 pounds $CaCl_2$ per MM s.c.f. Ten tray stages provide a specific gravity gradient beginning at the bottom tray stage (1) as follows:

| Tray number: | Specific gravity |
|---|---|
| 1 | 1.176 |
| 2 | 1.199 |
| 3 | 1.212 |
| 4 | 1.212 |
| 5 | 1.217 |
| 6 | 1.255 |
| 7 | 1.273 |
| 8 | 1.295 |
| 9 | 1.311 |
| 10 | 1.333 |

The brine inlet specific gravity was 1.360 and contained a water content of 1.78 pounds per pound of calcium chloride while the brine outlet specific gravity was 1.176 containing a water content of 4.25 pounds per pound of calcium chloride, a total water pickup of 2.47 pounds per pound of calcium chloride. The tests found that a total of $2.47 \times 16 + 39.5$ pounds of $H_2O$ was removed from each MM s.c.f., leaving 5.5 pounds $H_2O$/MM s.c.f. At a cost of 4¢ per pound of $CaCl_2$, in a brine solution, this makes the cost of chemical for dehydration of one million cubic feet of gas equal to 64¢. This compares to the cost of chemical for a comparable glycol dehydration unit of 75¢ per MM s.c.f. This was adequate water removal from the gas for its intended commercial usage.

One of the unobvious results from the tests is a much better dehydration of the gas over that of a solid bed system, because the equilibrium values of water in gas are based on the temperature of the brine, not the gas. This allows flexibility to changes in brine temperature (e.g., precooling of brine) relative to a usually fixed temperature of gas issuing from a well, and hence improved efficiency of dehydration. In the ordinary course of design of gas dehydrators, those skilled in the art have normally considered that because the mass of the gas passing through such a separator is greater than the desiccant, the desiccant or injection rapidly assumes a temperature near that of the gas and then naturally the equilibrium conditions must be made relative to the conditions of the gas.

For example, in a typical installation using a once through brine dehydrator as specified in this application, three or four gallons of brine are used per MM s.c.f. of gas, or, an average 40 pounds of liquid to 44,000 pounds of gas. Put another way, this is a ratio of 1,100 pounds of gas per pound of brine. Hence, the normal consideration of those skilled in the art is that the liquid temperature is of no moment in dehydration capabilities. It was considered that the temperature of the liquid would change so fast due to the mass of gas tending to raise the temperature that there could be no expected help from controlling the temperature of precooling the inlet brine.

Figure 5:
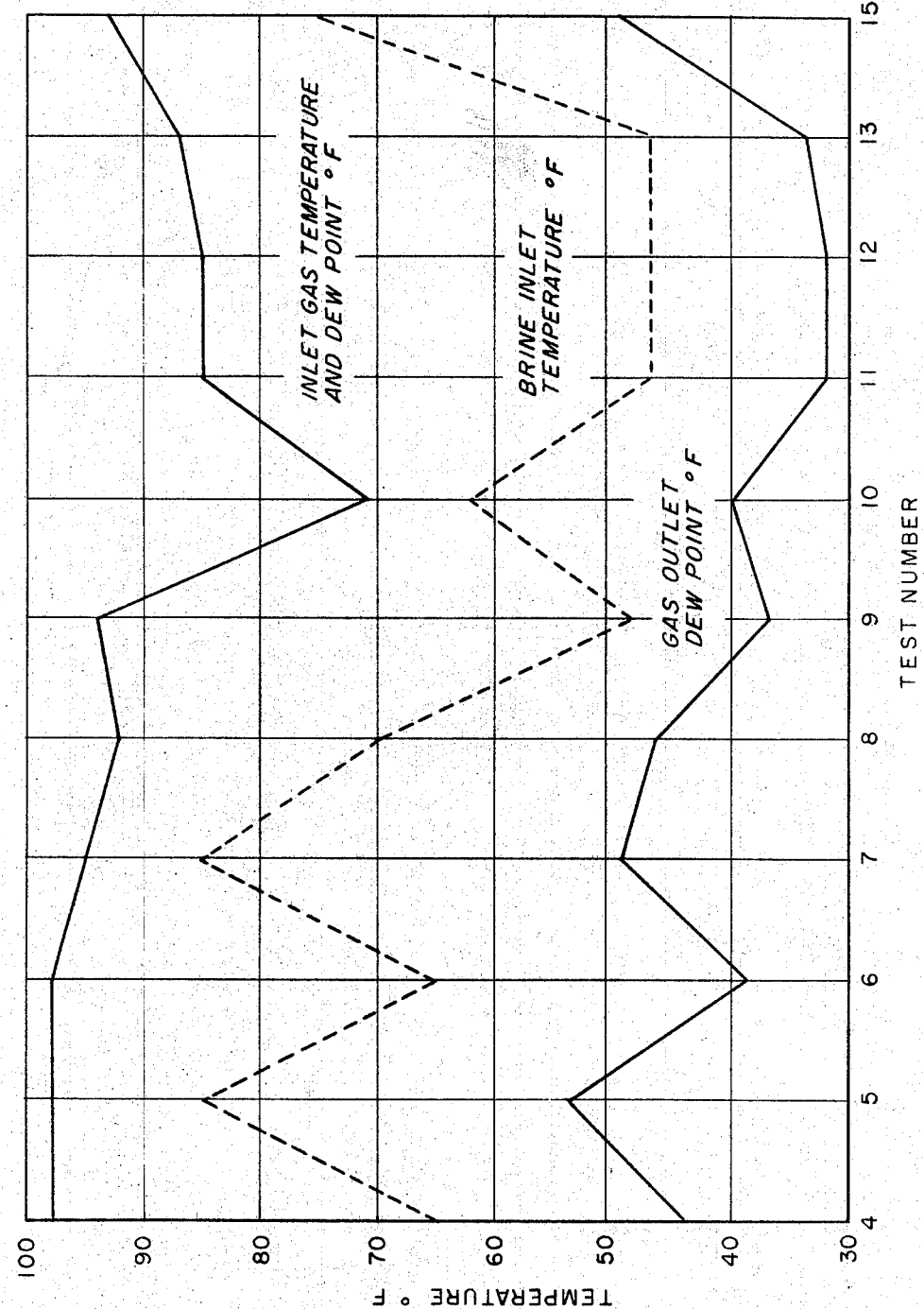
FIG. 5 is a chart depicting the relationship of brine temperature to gas dew point.

Tests indicate brine temperature can have a great deal of effect upon dehydration. FIG. 5 depicts results of eleven different tests and indicates that the outlet gas dew point appears to be a function of the brine inlet temperature and is completely independent of inlet gas temperature. This relation shows up more clearly on those tests where there was a large differential between the inlet gas temperature and the brine inlet temperature. This does not discount altogether the gas temperature having effect on the outlet dew point, as for example in Test 10 the dew point did not increase as much as would be expected by the increase in brine temperature due to the lower gas temperature during the test. Test No. 5 is a typical example: the water contained in the inlet gas was 40 pounds/MM s.c.f., and 3.21 gallons of brine per MM s.c.f. were circulated. This is equivalent to 12.85 pounds of calcium chloride ($CaCl_2$). The outlet gas water content was 10 pounds/MM s.c.f. of gas at a dew point of 53° F. The water pickup was 30/12.85 or 2.34 pounds of water/ $CaCl_2$.

In test No. 6 the outlet gas dew point was 39° F. or 6.5 pounds of water/MM s.c.f. of outlet gas. The inlet gas water content was 38 pounds. Hence, applicant's device was removing 31.5 pounds of water per MM s.c.f. An amount of 2.56 gallons of brine per MM were circulated, which picked up 3.075 pounds of water per pound of $CaCl_2$. This shows that with less $CaCl_2$ brine we can pick up more water (31.5−30)=1.5 pounds overall and more water per pound of $CaCl_2$ circulated when the temperature of the brine is low. The economic significance of this is that $CaCl_2$ at 3¢ per pound, in brine, cost 31¢ to dehydrate gas to 6.5 pounds of water in test No. 6, as compared to 38.5¢ to dehydrate to ten pounds of water per MM s.c.f. of gas in test No. 5. This is because of the brine temperature.

What is claimed is:

1. Apparatus for separating liquid and liquid in vapor form (normally water in vapor form) from gas using brine of specific gravity within the range of about 1.35 to 1.40 including a housing or contacting tower having lower, intermediate and upper portions;
   means to introduce liquid laden gas into said lower chamber for primary separation of said liquid;
   means to withdraw substantially dry gas from said upper portion;
   means to continuously introduce said brine into said upper portion countercurrent to said gas flow;
   a plurality of gas liquid-vapor separation stages in said intermediate portion wherein at each stage said liquid vapor laden gas and brine are contacted in concurrent flow across said stage and in countercurrent flow between said stages from said brine overflow from the next upper stage;
   each stage including:
      an upper tray across the interior cross-section of said housing and a lower tray connected thereto of diameter less than the interior of said housing,
      means centrally located to interconnect said upper and lower tray wherein liquid brine will traverse from said upper to said lower tray,
      means in said lower tray to maintain a constant level therein,
      a plurality of concentric housings extending from slightly above said liquid level in said lower tray to above said upper tray,
      conical means tapering upwardly-inwardly and coaxial with each of said housings and extending upward from said lower tray to above the lower end of said housing whereby said brine will aspirate with said gas in concurrent flow from said lower tray,
      means connectable at the upper end of said housing to intersect and divert said gas and brine flow and aid separation of liquid from said gas and/or to control flow therethrough; and
   means to withdraw said brine and/or other fluid separated from said gas from said lower portion and remove said brine and/or other fluid without regeneration or recycle to said apparatus.

2. Apparatus of claim 1 including means to control the temperature of said introduced brine.

3. Apparatus of claim 1 wherein said means connectable at the upper end is adjustable to control flow from zero to a desired maximum for the conditions and dimensions existing.

4. Apparatus of claim 2 wherein said means to control temperature is a refrigeration means to precool said brine prior to introduction to said housing.

5. Apparatus of claim 2 wherein said brine is a normally waste stream.

6. Apparatus for separating liquid and liquid in vapor form (normally water in vapor form) from gas using brine of specific gravity within the range of about 1.35 to about 1.40 including a housing having a lower, intermediate and upper portions;
   means to introduce liquid laden gas into said lower chamber for primary separation of said liquid;
   means to withdraw substantially dry gas from said upper chamber;
   means to continuously introduce said brine into said upper portion countercurrent to said gas flow;
   a plurality of gas liquid-vapor separation stages in said intermediate portion, wherein each of said stages includes:
      an upper tray across the interior cross section of said housing and a lower tray connected thereto of diameter less than the interior housing,
      means centrally located to interconnect said upper and lower tray wherein liquid brine will traverse from said upper to said lower tray,
      means in said lower tray to maintain a constant level therein,
      a plurality of gas flow nozzles in said lower tray concentrically positioned around said interconnection means extending to or slightly beyond said liquid level therein,
      concentric housing of larger diameter than said nozzle and extending upwardly from slightly below said liquid level to above said upper tray wherein gas flowing through said nozzles will aspirate brine in concurrent flow from said lower tray therewith, and
      baffle means extending over and above the top of said nozzle housing to intersect and divert said gas and brine flow and aid separating liquid from said gas,
   means to control the flow of gas through one or more of said gas flow nozzles; and
   means for permitting communication from the exterior of said housing to the interior thereof adjacent said nozzles for adjusting said flow.

7. Apparatus for separating liquid and liquid in vapor form (normally water in vapor form) from gas using brine of specific gravity within the range of about 1.35 to about 1.40 including a housing having lower, intermediate and upper portions;
   means to introduce liquid laden gas into said lower chamber for primary separation of said liquid;
   means to withdraw substantially dry gas from gas upper portion;
   means to continuously introduce said brine into said upper portion countercurrent to said gas flow;
   a plurality of gas liquid-vapor separation stages in said intermediate portion wherein at each stage said liquid laden gas and brine are contacted in concurrent flow across said stage and in countercurrent flow between said stages from said brine excess overflow from the next upper stage;
   an upper tray across the interior cross-section of said housing and a lower tray connected thereto of diameter less than the interior of said housing;
   means centrally located to interconnect said upper and lower tray wherein liquid brine will traverse from said upper to said lower tray;
   means in said lower tray to maintain a constant level therein;
   a plurality of concentric housings extending from slightly above said liquid level in said lower tray to above said upper tray;
   means coaxial with each of said housings extending upward from said lower tray to above the lower end of said housing whereby said brine will aspirate with said gas in concurrent flow from said lower tray; and
   adjustable means connectable at the upper end of said housing to intersect and divert said gas and bring flow and aid separation of liquid from said gas and/or to control flow from zero to a desired maximum through said housing under the conditions and dimensions existing.

8. A method of separating liquid and liquid in vapor form (normally water in vapor form) from gas comprising the steps of:
injecting said liquid laden gas in the lower portion of a substantially vertical vessel;
continuously injecting a brine solution, which normally is a waste byproduct of other chemical processes, into the upper portion of said vessel;
causing said gas to traverse in serial stages of flow within said brine so as to be in intimate contact flow across each stage;
thereafter withdrawing and disposing of said brine collected in the lower portion of said vessel without regeneration or recycle of said brine; and
withdrawing said substantially dehydrated gas from said upper part of said vessel.

9. A method of claim 8 plus the step of controlling the temperature of said brine prior to said injecting as a function of desired outlet gas dew point.

10. A method of claim 9 wherein said brine is precooled.

11. A method of claim 8 wherein said brine is essentially calcium chloride.

References Cited

UNITED STATES PATENTS

| | | | |
|---|---|---|---|
| 1,740,248 | 12/1929 | Klaiber | 55—31 |
| 1,858,158 | 5/1932 | Laird | 261—114 |
| 2,222,565 | 11/1940 | Kraft | 261—114 |
| 2,225,959 | 12/1940 | Miller | 55—19 |
| 2,916,103 | 12/1959 | Daugherty | 55—221 |
| 3,170,776 | 2/1965 | Knight et al. | 261—114 |

REUBEN FRIEDMAN, Primary Examiner

C. N. HART, Assistant Examiner

U.S. Cl. X.R.

55—171